US006242125B1

(12) United States Patent
Eidler et al.

(10) Patent No.: US 6,242,125 B1
(45) Date of Patent: Jun. 5, 2001

(54) BATTERY CIRCULATION SYSTEM WITH IMPROVED FOUR-WAY VALVE

(75) Inventors: Phillip A. Eidler, Muskego; Peter J. Lex, Wauwatosa; Robert R. Rixford, Sheboygan Falls, all of WI (US); Bjorn Jonshagen, South Fremantle (AU)

(73) Assignee: ZBB Technologies, Inc., Wauwatosa, WI (US)

( * ) Notice: Subject to any disclaimer, the term of this patent is extended or adjusted under 35 U.S.C. 154(b) by 0 days.

(21) Appl. No.: 09/305,218

(22) Filed: May 4, 1999

Related U.S. Application Data

(60) Provisional application No. 60/084,386, filed on May 6, 1998.

(51) Int. Cl.[7] .............................. H01M 2/38; H01M 8/04
(52) U.S. Cl. ................... 429/51; 429/50; 429/64; 429/63; 429/61; 429/72; 429/71; 429/82; 429/95; 429/101; 429/105; 429/14; 429/17
(58) Field of Search .................. 429/51, 64, 63, 429/61, 72, 76, 74, 71, 14, 17, 101, 105, 82, 95, 50

(56) References Cited

U.S. PATENT DOCUMENTS

| | | |
|---|---|---|
| 467,372 | 1/1892 | Gendron . |
| 1,354,800 | 10/1920 | Butler . |
| 2,346,313 | 4/1944 | Keller . |
| 2,584,117 | 2/1952 | Elrod, Jr. . |
| 3,357,860 | 12/1967 | Stachurski . |
| 3,855,005 | 12/1974 | Huhta-Koivisto . |
| 3,874,934 | 4/1975 | Zangrando . |
| 3,900,640 | 8/1975 | Vechiotti . |
| 3,928,078 | 12/1975 | Köthe et al. . |
| 3,966,870 | 6/1976 | Vecchiotti . |
| 3,993,507 | 11/1976 | Hardigg . |
| 4,258,107 | 3/1981 | Nakagawa . |
| 4,304,823 | 12/1981 | Lemelson . |
| 4,346,150 | * 8/1982 | Bellows et al. ..................... 429/18 |
| 4,491,625 | 1/1985 | Kantner . |
| 4,614,694 | 9/1986 | Manthis . |
| 4,833,047 | 5/1989 | Isoi et al. . |
| 4,980,249 | 12/1990 | Isoi et al. . |
| 5,543,243 | 8/1996 | Brecht . |

(List continued on next page.)

OTHER PUBLICATIONS

Tomazic, Gerd, Zinc–bromine battery with circulating electrolytes, Journal of Power Sources, p. 168, Jan. 1998.*

Primary Examiner—Carol Chaney
Assistant Examiner—Angela J. Martin
(74) Attorney, Agent, or Firm—Godfrey & Kahn, S.C.

(57) ABSTRACT

A circulation system for a flowing-electrolyte battery having at least one electrochemical cell, an anolyte reservoir, and a catholyte reservoir. The circulation system includes an anolyte pump coupled in fluid flowing relationship to the anolyte reservoir which pumps anolyte from the anolyte reservoir to the at least one electrochemical cell. A catholyte pump is coupled in fluid flowing relationship to the catholyte reservoir and also pumps catholyte to the at least one electrochemical cell. A second phase pump is coupled in fluid flowing relationship to the catholyte reservoir and is used to introduce second phase electrolyte into the aqueous catholyte pumped by the catholyte pump. The second phase pump is controlled by a controller so that the second phase is introduced into the catholyte stream in a metered fashion. A controllable four-way valve is coupled in fluid flowing relationship to the catholyte pump and operable to direct the flow of catholyte through the electrochemical cell in a first direction, and periodically reverse the flow of the catholyte in a second direction. Metering the amount of second phase injected into the catholyte stream and reversing catholyte flow improve battery efficiency.

14 Claims, 7 Drawing Sheets

U.S. PATENT DOCUMENTS

| | | |
|---|---|---|
| 5,601,943 | 2/1997 | Eidler et al. . |
| 5,607,788 | 3/1997 | Tomazic . |
| 5,610,802 | 3/1997 | Eidler et al. . |
| 5,738,690 | 4/1998 | Hughett et al. . |
| 5,813,838 | 9/1998 | Bae et al. . |
| 5,862,830 | 1/1999 | Landau . |

\* cited by examiner

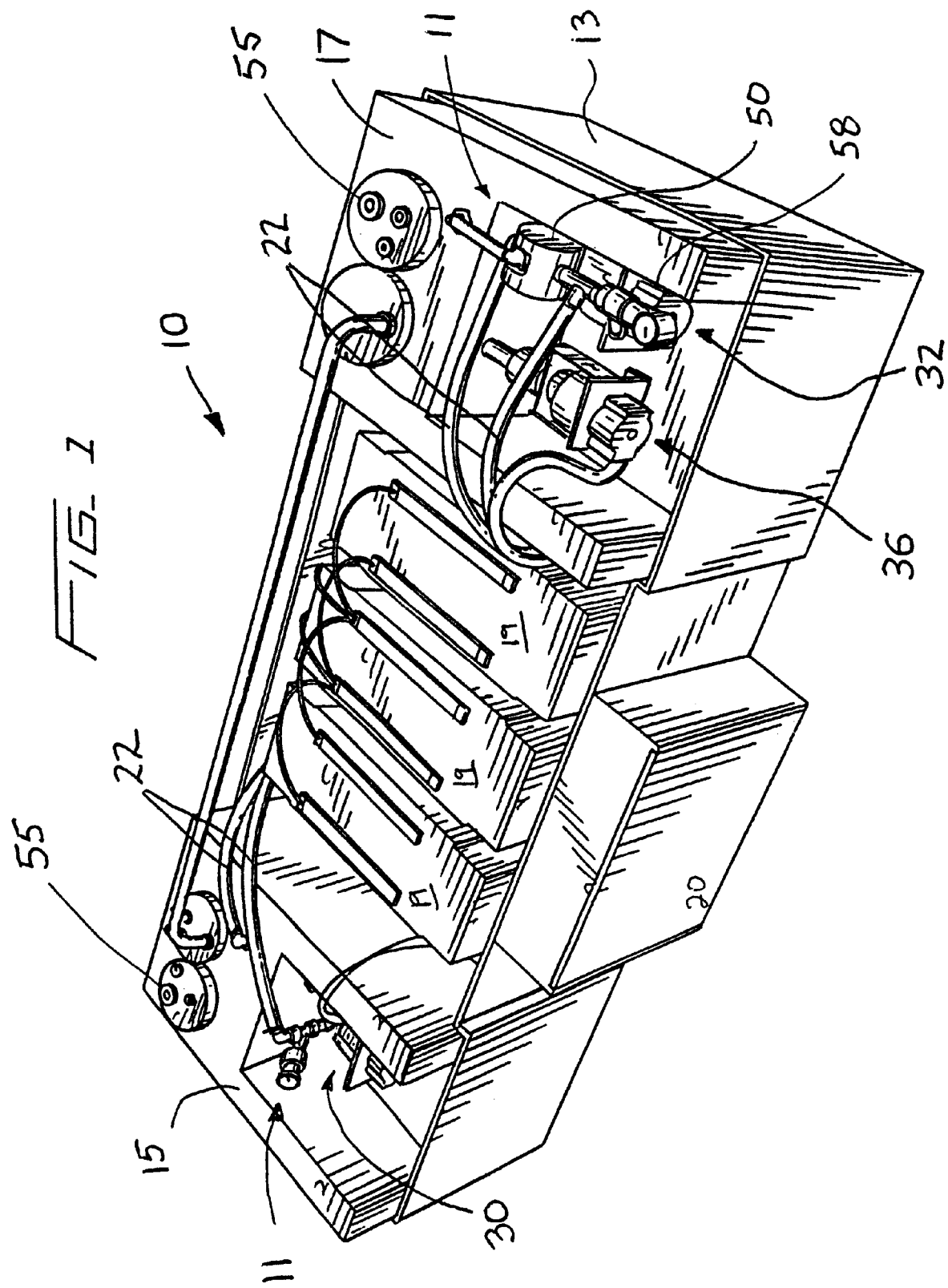

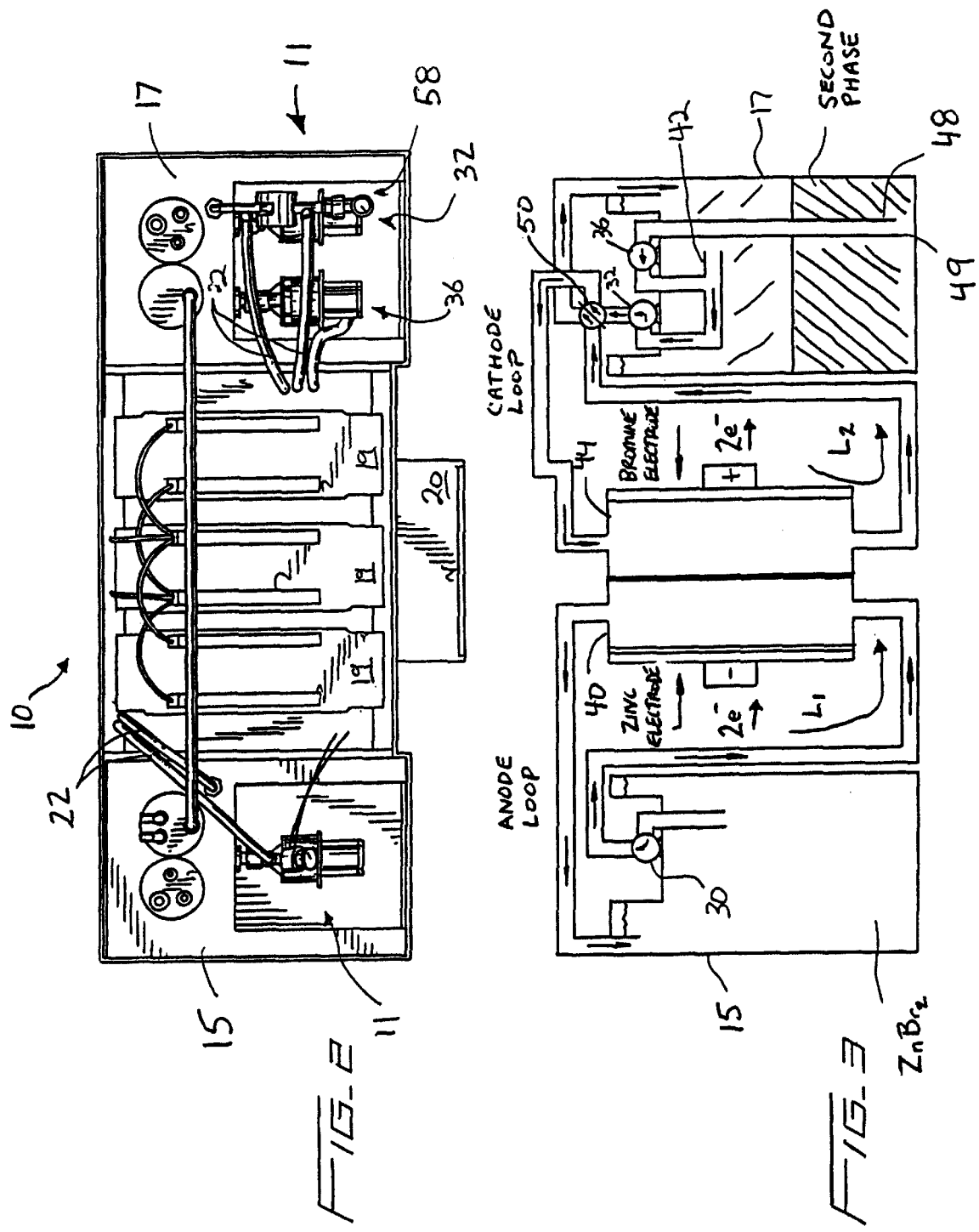

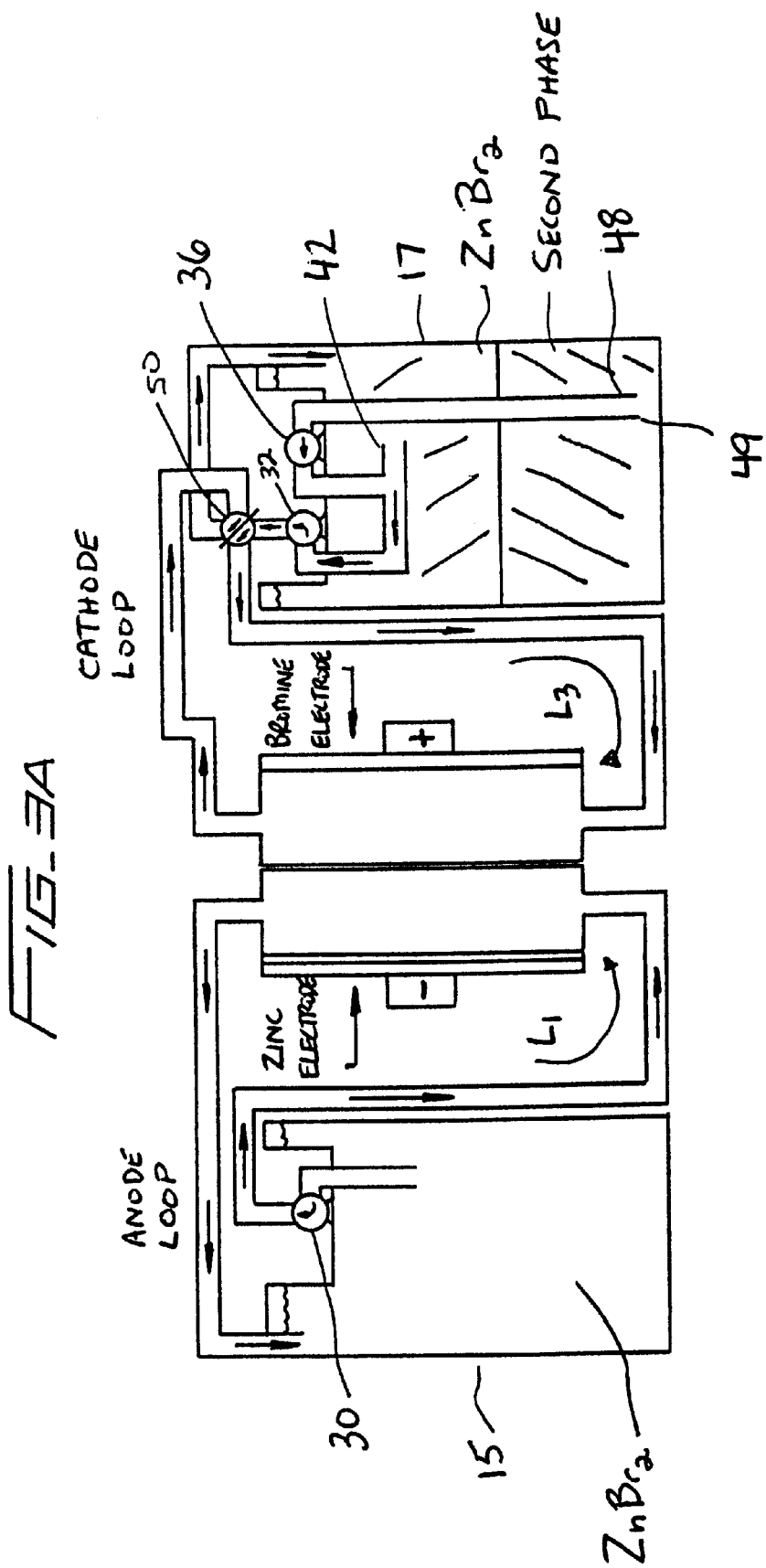

BATTERY CIRCULATION SYSTEM WITH IMPROVED FOUR-WAY VALVE

CROSS-REFERENCE TO RELATED APPLICATIONS

This application claims the benefit of U.S. Provisional Application Ser. No. 60/084,386, filed May 6, 1998.

FIELD OF THE INVENTION

The present invention relates generally to energy storage systems. More particularly, the present invention relates to improvements in the electrolyte circulation systems of the energy storing devices (such as batteries) used in energy storage systems.

BACKGROUND OF THE INVENTION

Electric power utility companies use a variety of techniques to meet fluctuating power demand while maintaining a relatively constant level of electric power production. One way to handle short lived, irregularly occurring electric power demand increases is to electrically couple an electric energy storage system to an electric power transmission system so that the energy storage system may be utilized, or turned on, to provide additional electric power during peak demand.

While some systems such as the one shown in U.S. Pat. No. 5,610,802 have been developed to address peak demand needs, ever increasing demand for power requires that such systems operate very efficiently, with little need for human supervision, be designed to minimize leaks or other releases of potentially hazardous materials, and be relatively inexpensive. Of particular importance to the efficient operation of such systems is the effective and efficient operation of the energy storing devices used in them. Often these devices are liquid electrolyte batteries, particularly zinc-bromine batteries.

Zinc-bromine batteries are a type of bipolar, metal-halogen battery with a stack of cells made from a series of alternating electrodes and separators. An electrolyte flows through the stack of cells and conducts electricity ionically. In a bipolar, zinc-bromine battery each cell includes a bipolar electrode upon which an anodic and a cathodic reaction occurs.

The electrolyte used in a zinc-bromine battery is a fluid containing aqueous zinc-bromide and quaternary ammonium salts. It is circulated through the cells to and from external reservoirs. For each cell, one half cell contains an anolyte and the other half cell contains a catholyte. The anolyte flows through a common anolyte manifold to each anodic half cell and the catholyte flows through a parallel common catholyte manifold to each cathodic half cell. The alternating separators and electrodes are sealed together in a manner that prevents communication between the anolyte and catholyte systems.

A zinc-bromine battery may be in various states including a charged state and a discharged state. In addition, the battery may cycle through these states. When a zinc-bromine battery is in a discharged state, the anolyte is chemically identical to the catholyte. When a zinc-bromine battery is charged the following reaction takes place.

$Zn^{++}+2e^- \rightarrow Zn$ $2Br^- \rightarrow Br_2+2e^-$

Zinc is plated on the anode, and bromine is evolved on the cathode. The bromine is immediately complexed by quaternary ammonium ions in the electrolyte to form a dense second phase that is removed from the battery stack with the flowing electrolyte. When the battery is charged, zinc is stored on one side of each electrode and complex bromine is stored in a catholyte reservoir.

During discharge, the following reaction takes place.

$Br_2+2e^- \rightarrow 2Br^-$ $Zn \rightarrow Zn^{++}+2e^-$

Zinc is oxidized and the released electrons pass through the electrode where they combine with molecular bromine to form bromide ions. Positively charged zinc ions travel through the separator and remain in solution, and at the same time, bromide ions pass through the separator in the opposite direction and remain in solution.

As discussed above, the electrolyte used in most zinc-bromine batteries is circulated within the battery. Circulation of the electrolyte has several advantages. First it removes and externally stores bromine that is produced during charge. Thus, the active materials of the battery, which are zinc and bromine, are separated from each other. Second, circulation of the electrolyte ensures uniform zinc metal deposition and deplating during charge and discharge, respectively. Third, circulation of the electrolyte removes excess heat from the system.

While all these advantages are achieved with present circulation systems, there are still several problems that known circulation systems fail to address. One of the more significant problems is the entrapment of gas and vapor in the electrolyte as it circulates through the battery. A possible side reaction in such batteries could cause the formation of small amounts of hydrogen gas during the charging process and the hydrogen may accumulate in the stack of cells hindering the flow of electrolyte in the battery. Of less importance, but still problematic, is the entrapment of other gases and vapors that often infiltrate the battery through its pressure equalization and release valves. The presence of these gases and vapors may also hinder the flow of electrolyte.

In addition to those already noted, present electrolyte circulation systems have several other shortcomings. The circulation of electrolyte through a conventional battery is controlled through one anolyte pump/motor and one catholyte pump/motor. The catholyte pump introduces a mixture of second phase and aqueous phase electrolyte (catholyte) into the battery during discharge. Conventional technology uses one of two techniques to produce this mixture. A first technique uses a single pump inlet tube that has two branches on one end. One branch is positioned at the bottom of the reservoir tank and serves as the inlet for the dense second phase. The other branch has a pickup positioned higher in the reservoir tank and serves as the inlet for the aqueous catholyte phase. In this design, the amount of second phase introduced into the battery can not be adjusted during discharge. Also, this design requires the second phase to be circulated during both discharge and charge.

Another known design uses an outlet at the bottom of the reservoir tank and gravity to introduce the second phase into the aqueous catholyte. This technique can adjust the amount of second phase allowed into the aqueous catholyte input and even shut it off during charge. However, a major drawback to this system is that the second phase is drawn from the bottom of the tank requiring a hole to be placed at the lowest point in the tank. With a hole in this position, any compromise (puncture, break, etc.) of the outlet has the potential risk of a large electrolyte leak.

Accordingly, it would be desirable to have a system that eliminated or reduced the amount of gas and vapors entrapped in a liquid electrolyte battery. It would also be desirable to have a system where the amount of second phase circulated through the battery could be readily controlled, but with a design that would minimize the amount and effect of electrolyte leaks.

SUMMARY OF THE INVENTION

Therefore, an object of the present invention is to provide a circulation system that aids in removing entrapped gas and vapor from the battery stack. Another object of the present invention is to provide a pump-based circulation system that permits increased control over electrolyte flow in the battery, particularly of the second phase. These and other objects and advantages are achieved in a battery having at least one electrochemical cell, an anolyte reservoir coupled to the cell, an anolyte pump, a catholyte reservoir coupled to the cell, a catholyte pump, a second phase pump mounted on the catholyte cell, and a controllable four-way valve for reversing the flow of electrolyte through the system. The improved pump configuration and other features permit better control of electrolyte flow in the batteries and improve efficiency.

BRIEF DESCRIPTION OF THE DRAWINGS

Throughout the following views, reference numerals will be used on the drawings, and the same reference numerals will be used throughout the several views and in the description to indicate same or like parts of the invention.

FIG. 1 is a perspective view of a battery module employing the four-way valve and circulation system of the present invention;

FIG. 2 is a top plan view of the battery module shown in FIG. 1;

FIG. 3 is a schematic view of the circulation system used in the present invention;

FIG. 3A is another schematic view of the circulation system used in the present invention showing flow of electrolyte through the four-way valve in a reverse direction;

DETAILED DESCRIPTION OF THE INVENTION

Figure 1A:
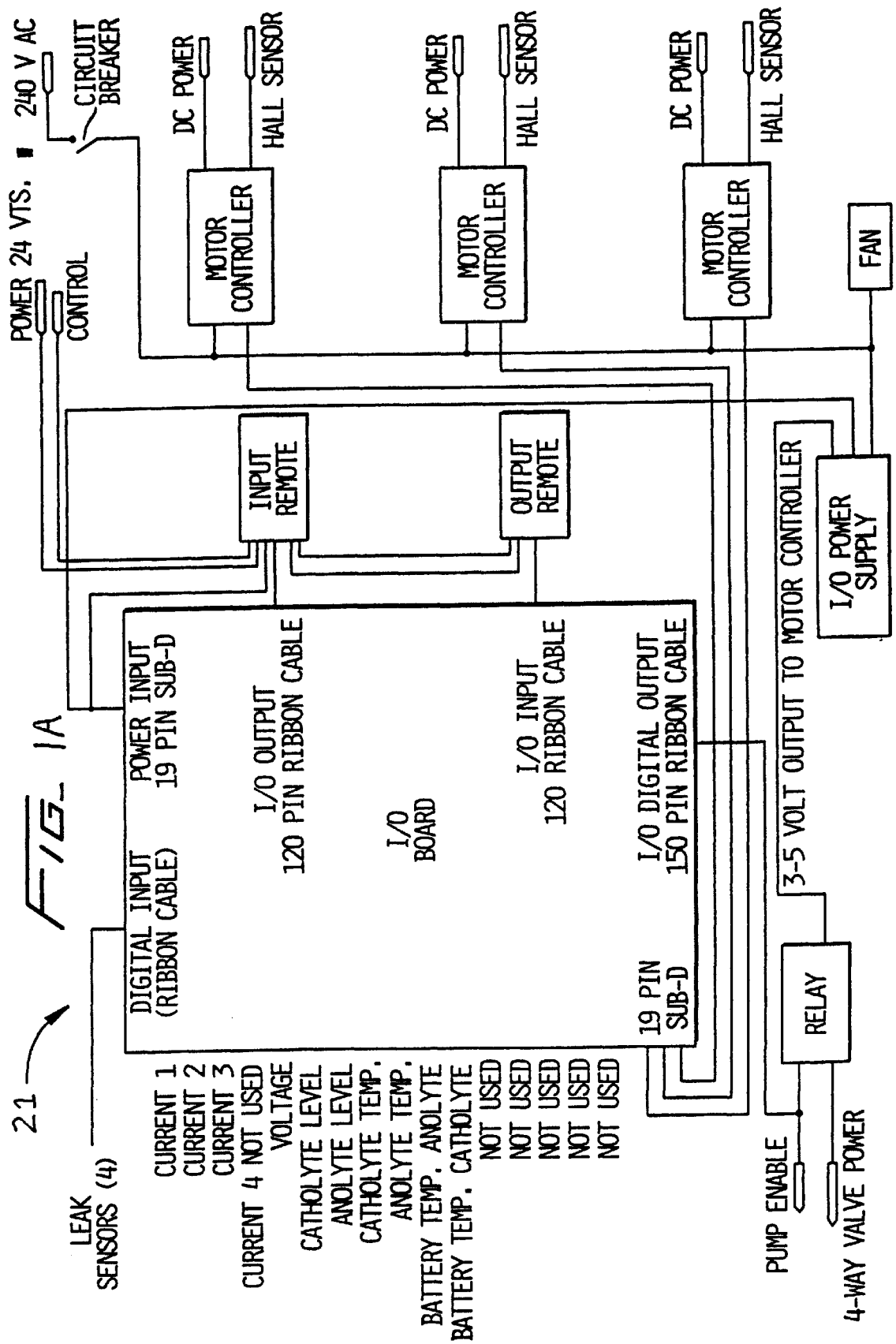
FIG. 1A is a schematic diagram of the controller used in the present invention.
Figure 4:
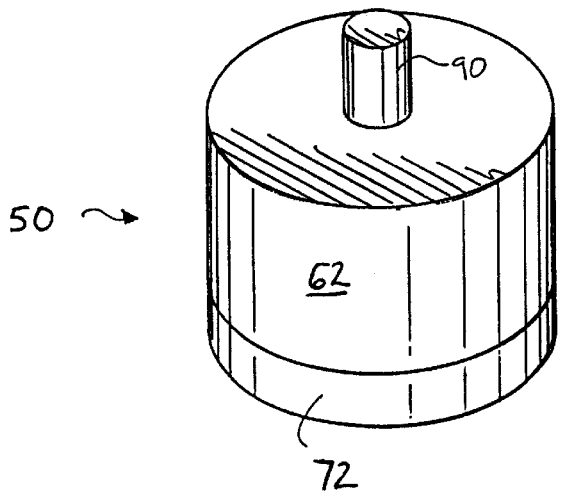
FIG. 4 is a perspective view of the four-way valve used in the circulation system of the present invention.
Figure 5:
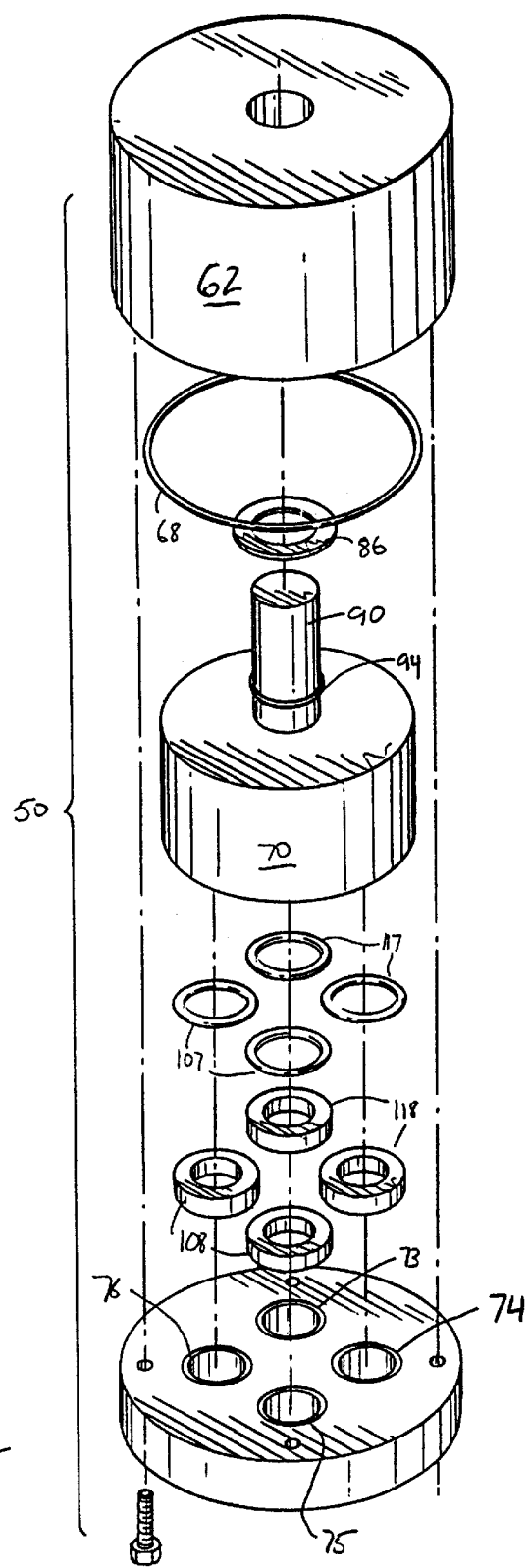
FIG. 5 is an exploded view of the four-way valve used in the present invention.
Figure 6:
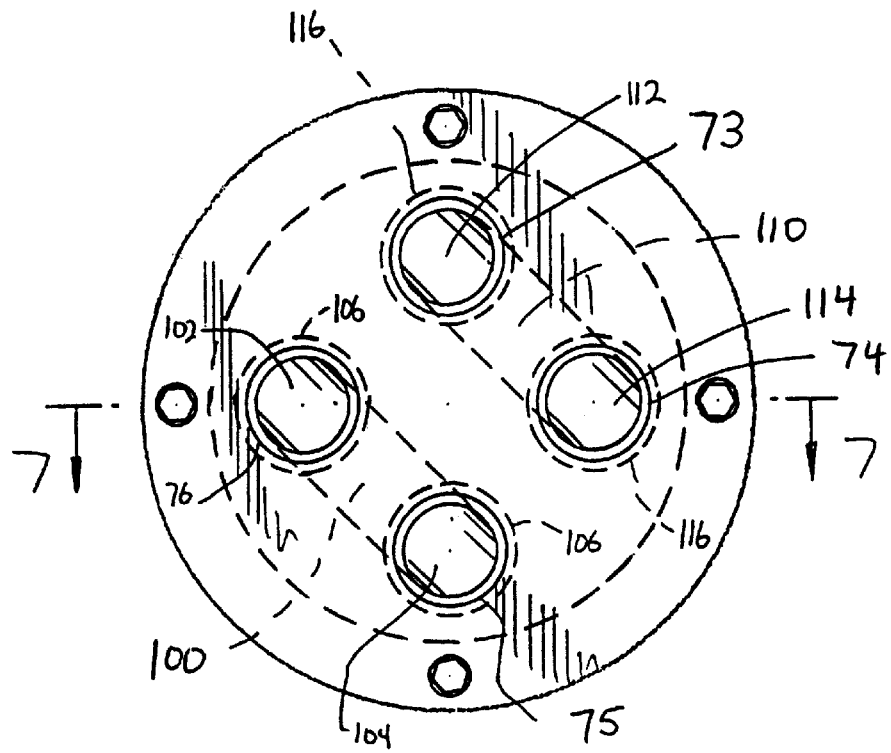
FIG. 6 is an end view of the four-way valve used in the present invention.
Figure 7:
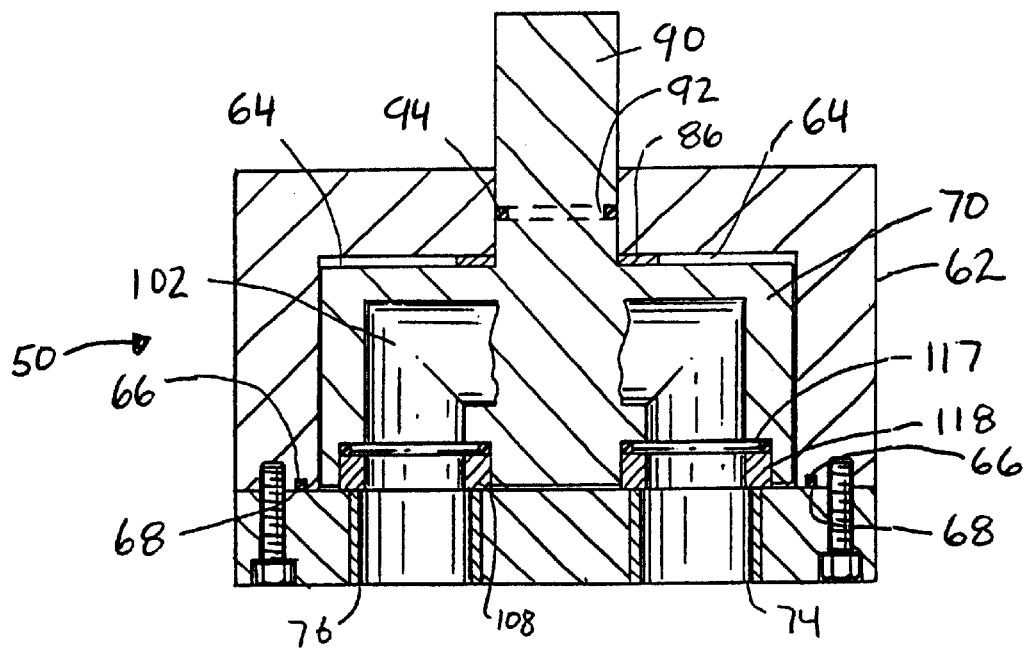
FIG. 7 is a cross-sectional view of the four-way valve used in the present invention.

A battery module 10 having a circulation system 11 made in accordance with the teachings of the present invention is shown in FIG. 1. The battery module 10 includes a container 13 in which an anolyte reservoir 15, a catholyte reservoir 17, and a plurality of batteries 19 are positioned. The container 13 has a lid (not shown) which seals the entire module. The container 13 includes a cabinet 20 for housing a module controller 21 (FIG. 1A) used to monitor the batteries and control the system's pumps (discussed below). Each of the batteries 19 includes a stack of electrochemical cells that store and release energy in a manner essentially as discussed above. When the batteries 19 are operating, electrolyte flows to and from the reservoirs 15 and 17 through plumbing 22. Plumbing suitable for use in the present invention includes VITON® tubing. Barbed fittings and spring clamps may be used to couple the tubing to the various components of the module 10. Connections made may be wrapped with a TEFLON® tape.

The circulation system 11 is best seen by reference to FIGS. 2 and 3. The system 11 includes an anolyte pump 30 mounted near the top of the anolyte reservoir 15, a catholyte pump 32 mounted near the top of the catholyte reservoir 17, and a second phase pump 36 also mounted near the top of the catholyte reservoir 17. In one embodiment of the present invention, each of the pumps 30, 32, and 36 is operated by a variable, high-efficiency, DC motor. The benefits of using such motors include a reduction in the amount of energy needed to operate them and reduced maintenance and support compared to conventional brushed DC or AC motors.

When the battery is charged, the anolyte pump 30 pumps anolyte from the anolyte reservoir 15 to the anodic half cells (represented by the half cell 40 in FIG. 3) in the batteries 19. The anolyte is circulated in a direction shown by arrow $L_1$ and the amount of electrolyte circulated is adjusted in order to maintain a relatively constant volume level of electrolyte in the anolyte reservoir 15. More specifically, the rate of circulation is adjusted to accommodate changes in volume caused by changes in the density, temperature, and viscosity of the electrolyte which occur while the battery is operating.

As discussed above, each battery 19 is fabricated with a microporous (or in some cases an ion permeable) separator (not shown) so the electrolyte has the ability to gradually migrate into the other electrolyte circulation loop in the event of a slight pressure imbalance. To correct this imbalance, some previous systems simply used a valve to reduce the flow of one electrolyte circulation loop. It is known that this type of restriction will increase pressure losses reducing the efficiency of the system. In the present invention, the speed of the anolyte pump is simply raised or lowered depending on the level of electrolyte in the anolyte reservoir 15.

The catholyte pump 32 draws aqueous catholyte from the top of the catholyte reservoir 17 through an intake 42. The catholyte is pumped from the reservoir 17 to the cathodic half cells (represented by the half cell 44 in FIG. 3) in the batteries 19. The catholyte is circulated in a direction shown by arrow $L_2$ with the electrolyte flowing from the top to the bottom of each cathodic half cell.

The second phase electrolyte generated during charge will settle to the bottom of the reservoir 17. Since the intake 42 is positioned high (at the mid-point or higher) within the reservoir 17, the pump 32 does not take in any of the dense second phase. Rather, circulation of the second phase is controlled through the second phase pump 36 which draws the second phase from intake 48. The intake 48 has a mouth 49 which is positioned adjacent to the bottom of the reservoir 17. So positioned, no aqueous electrolyte is drawn by the pump 36 and by controlling the activity of the pump 36 (i.e., on/off and pump rate) the amount of second phase circulated through the batteries 19 may be controlled. Desired control may be achieved through the module controller 21 which can adjust the pump 36 so that the amount of second phase injected into the aqueous catholyte stream can be varied according to the discharge rate of the batteries 19. Controlling the amount of second phase in the catholyte is important because it contains the bromine needed for the discharge reaction. At high current discharge rates, more bromine is needed for the reaction to take place. Therefore, more second phase is needed, and the pump speed is increased. The opposite occurs at lower current discharge rates. Less second phase is needed, and the pump speed is decreased.

Flow from the catholyte pump 32 is directed to the catholyte half cells in the batteries 19 through a four-way valve 50. Preferably, the valve 50 is manufactured from a chemically-resistant material such as polyvinyl chloride (PVC), polyethylene, polypropylene, polyvinyldifluoride (PVDF) or polytetrafluoroethylene (PTFE). As shown in FIG. 3, the valve 50 is normally positioned so that electrolyte is circulated through the cathodic half cells from top to bottom. However, periodically the valve is rotated 90° (FIG. 3A) so that flow through the cathodic half-cells is reversed and follows the path generally indicated by the arrow $L_3$. When reversed, flow is directed from bottom to top. Reversing the flow pushes gas and vapors trapped at the top of the half cells out of each of the half cells to the catholyte reservoir. Once in the reservoirs, the gases are released to the atmosphere through one or more release valves 55.

Although manual operation is possible, in one embodiment of the present invention movement of the valve 50 is controlled by the module controller 21 or similar programmable controller. In particular, the four-way valve 50 is coupled to an actuator 58 (FIGS. 1 and 2) which is controlled by the module controller 21. The actuator 58 is turned on periodically to reverse catholyte flow. An actuator suitable for use in the present invention is the EL-O-MATIC ELS-8 actuator, which is commercially available from Tubemakers Piping System, North Fremantle, Western Australia, with the following specifications: rotation: 90 degrees; torque: 8Nm; voltage: 240V AC; materials: steel base plate, cover, drive spindle, and fastenings; finish: all external steel parts zinc plated, cover has a two part polyurethane finish. The inventors have found that a periodic schedule where rotation occurs every hour for one minute is effective to increase the efficiency of the battery and prevent the build up of gases in the batteries.

As best seen by reference to FIGS. 4–7, the valve 50 includes a main body 62 which has a hollow interior portion 64 and toroidal channel 66 for receiving a sealing ring 68. The interior portion 64 houses a valve body 70 and is closed by an endcap 72 having four ports 73, 74, 75, and 76. The endcap 72 is fastened to the main body 70 by screws or similar mechanisms.

The valve body 70 is spaced from the main body 62 by a spacer 86, such as a TEFLON® spacer, and has a valve stem 90 with a circumferential channel 92 for receiving a sealing ring 94. The valve stem 90 is coupled to the actuator 58. The valve body 70 has a first U-shaped chamber 100 with two axially positioned legs 102 and 104. Each leg 102 and 104 is substantially identical and terminates in a port 106 which seats a compressible O-ring 107 topped by a relatively hard, low-friction ring 108, such as a TEFLON® ring. The valve body 70 has a second U-shaped chamber 110, which similarly has two legs 112 and 114. Each leg 112 and 114 is substantially identical and terminates in a port 116, which seats a compressible O-ring 117 topped by a relatively hard, low-friction ring 118. The ports 106 and 116 are configured to match the ports 73, 74, 75, and 76. Depending on the rotation of the valve body 70, the ports 106 may be aligned with the ports 76 and 75 or 75 and 74. Similarly, the ports 116 may be aligned with the ports 73 and 74 or the ports 76 and 73. Thus, the valve 50 may direct two input flows along one of two paths.

A key to the successful operation of the four-way valve 50 is its ability to seal in the electrolyte flowing through it. In other words, the four-way valve is designed to prevent the electrolyte from leaking or seeping out of the valve or into unintended places within the valve. The seals provided by the compressible O-rings 107, 117 and low friction rings 108, 118 prevent such leaks and seepage while still permitting the valve body 70 to rotate against the inner surface of the endcap 72. If any leakage occurs, the seal provided by the sealing ring 68 prevents electrolyte from escaping from the valve 50.

Figure 8:
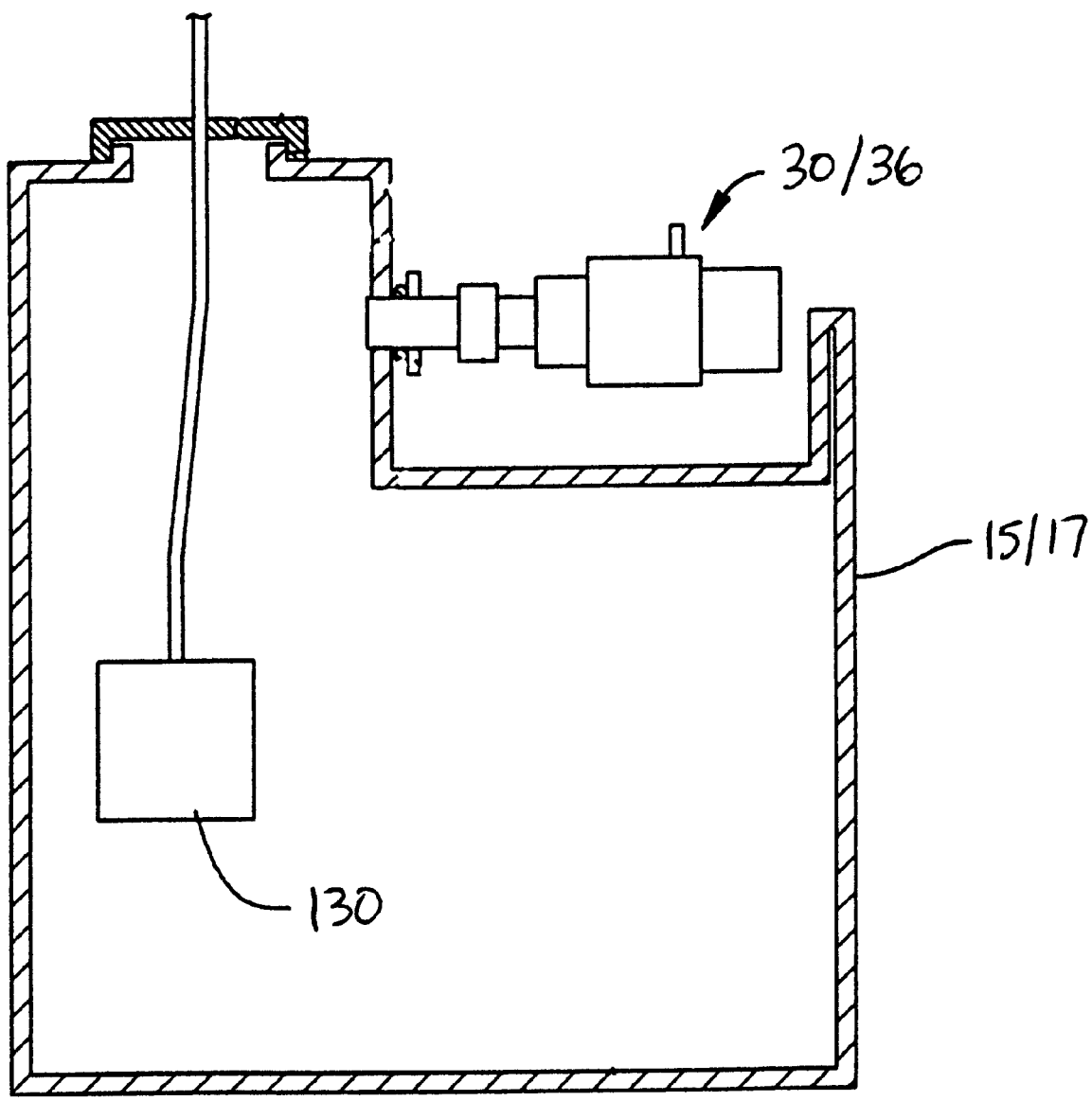
FIG. 8 is a cross-sectional view of an electrolyte reservoir used in the present invention.

Another feature of the present invention involves electrolyte level control. The electrolyte levels in the batteries 19 can be controlled using liquid level sensors 130 (FIG. 8) placed in each in each reservoir 15, 17, and coupled in data exchange relation to the controller 21. If an imbalance in levels is sensed, as indicated by a high liquid level sensor value, the speed of the anolyte pump 30 may adjust to even out the levels. The change in the pump speed adjusts the relative electrolyte pressure in the cell stack by forcing liquid across the microporous separators between the cells to re-establish a balance in the reservoirs 15 and 17. If both liquid level sensors in the reservoirs 15 and 17 sense "high" levels, the batteries 19 are shut down by the controller 21. Such a condition would indicate that additional fluid was entering the reservoirs 15 and 17 from another source, such as a heat exchanger used to cool the electrolyte. As with a high level condition, if both liquid level sensors in the reservoirs 15 and 17 sensed a "low" level, the batteries 19 are shut down by the controller. Such a condition would indicate a leak of electrolyte from some location in the system 10. Once shut down the leak could be investigated and repaired before the battery was again operated.

As can be seen from the above, the present invention provides an improved circulation system where flow of second phase to zinc-bromine batteries can be readily controlled and metered and gas entrapped in the cathodic cells of such batteries can be removed resulting in improved battery performance. Further, liquid electrolyte level can be controlled. However, while the circulation system, four-way valve, and other components of the invention were described by reference to the drawings and examples presented herein, these examples are not meant to limit the scope of the invention. It should be understood that many variations and modifications may be made while remaining within the spirit and scope of the invention. Further, the invention herein described is related to the subject matter disclosed in U.S. Pat. Nos. 5,610,802; 5,650,239; 5,626,986; 5,600,534; 5,591,538; 5,605,771; and 5,601,943. The disclosures of these references are incorporated by reference herein.

What is claimed is:

1. A circulation system for a flowing-electrolyte battery having at least one electrochemical cell, an anolyte reservoir, and a catholyte reservoir, the circulation system comprising:

an anolyte pump coupled in fluid flowing relationship to the anolyte reservoir and for pumping anolyte from the anolyte reservoir to the at least one electrochemical cell;

a catholyte pump coupled in fluid flowing relationship to the catholyte reservoir and for pumping catholyte to the at least one electrochemical cell;

a second phase pump coupled in fluid flowing relationship to the catholyte reservoir and for introducing second phase electrolyte into the aqueous catholyte pumped by the catholyte pump;

a controller for controlling the operation of the second phase pump; and a controllable four-way valve coupled in fluid flowing relationship to the catholyte pump and operable for directing the flow of catholyte through the at least one electrochemical cell in a first direction, and periodically reversing the flow of the catholyte in a second direction.

2. A circulation system as in claim 1; wherein the four-way valve comprises a main body having a hollow interior portion;

a valve body housed within the hollow interior portion, the valve body having a valve stem, a first U-shaped chamber with two axially positioned legs, a second U-shaped chamber having two axially positioned legs, each leg of the first and second U-shaped members terminating in a port; and an end cap having four ports mounted on the main body;

wherein the valve body is rotatable within the main body such that the ports of the first and second U-shaped chambers may be aligned with the ports in the end cap.

3. A circulation system as in claim 2, wherein each of the ports in the legs of the first and second U-shaped chambers includes a compressible ring topped by a substantially non-compressible, low-friction ring.

4. A circulation system as in claim 2, further comprising an actuator coupled to the valve stem of the valve body, the actuator coupled in data transmission relation to the controller.

5. A circulation system as in claim 4, wherein the controller is operable to actuate the actuator such that it rotates the four-way valve every hour for a period of one minute.

6. A circulation system as in claim 1, wherein the controller is coupled to the anolyte and catholyte pumps and operable to adjust the speeds of each.

7. A circulation system for a flowing-electrolyte battery having at least one electrochemical cell, an anolyte reservoir, and a catholyte reservoir, the circulation system comprising:

an anolyte pump mounted near the top of the anolyte reservoir and for pumping anolyte from the anolyte reservoir to the at least one electrochemical cell;

a catholyte pump mounted near the top of the catholyte reservoir and for pumping catholyte to the at least one electrochemical cell;

a second phase pump mounted near the top of the catholyte reservoir and for introducing second phase electrolyte into the aqueous catholyte pumped by the catholyte pump, the second phase pump having an intake with a mouth positioned adjacent to the bottom of the catholyte reservoir;

a controller for controlling the operation of the second phase pump; and a controllable four-way valve coupled in fluid flowing relationship to the catholyte pump and operable for directing the flow of catholyte through the at least one electrochemical cell in a first direction, and periodically reversing the flow of the catholyte in a second direction.

8. A circulation system as in claim 7; wherein the four-way valve comprises a main body having a hollow interior portion;

a valve body housed within the hollow interior portion, the valve body having a valve stem, a first U-shaped chamber with two axially positioned legs, a second U-shaped chamber having two axially positioned legs, each leg of the first and second U-shaped members terminating in a port; and an end cap having four ports mounted on the main body;

wherein the valve body is rotatable within the main body such that the ports of the first and second U-shaped chambers may be aligned with the ports in the end cap.

9. A circulation system as in claim 8, wherein each of the ports in the legs of the first and second U-shaped chambers includes a compressible ring topped by a substantially non-compressible, low-friction ring.

10. A circulation system as in claim 8, further comprising an actuator coupled to the valve stem of the valve body, the actuator coupled in data transmission relation to the controller.

11. A circulation system as in claim 10, wherein the controller is operable to actuate the actuator such that it rotates the four-way valve every hour for a period of one minute.

12. A circulation system as in claim 7, wherein the controller is coupled to the anolyte and catholyte pumps and operable to adjust the speeds of each.

13. A circulation system as in claim 7, further comprising a first level sensor positioned in the anolyte reservoir and a second level sensor positioned within the catholyte reservoir, the first and second level sensor coupled in data exchange relation to the controller, and wherein the controller adjusts the speed of the anolyte pump to adjust the level of electrolyte in the system.

14. A method of removing gas from a liquid electrolyte battery having one or more cathodic half cells, the method comprising the step of periodically reversing the direction of flow of electrolyte through the cathodic half cells to push gas out of the half cells to an electrolyte reservoir.

* * * * *